United States Patent
Peters et al.

[11] Patent Number: 6,023,748
[45] Date of Patent: Feb. 8, 2000

[54] MULTIPLE CLIENT MEMORY ARBITRATION SYSTEM CAPABLE OF OPERATING MULTIPLE CONFIGURATION TYPES

[75] Inventors: Michael J. Peters, Fort Collins; Gene Maine, Longmont, both of Colo.

[73] Assignee: ADAPTEC, Inc., Milpitas, Calif.

[21] Appl. No.: 08/928,984

[22] Filed: Sep. 12, 1997

[51] Int. Cl.[7] .................................................. G06F 13/18
[52] U.S. Cl. ........................ 711/151; 711/130; 711/158; 710/240; 710/107
[58] Field of Search .................................. 711/151, 158, 711/131, 149, 130; 710/128, 113, 114, 116, 110, 107, 240, 119, 126; 709/240

[56] References Cited

U.S. PATENT DOCUMENTS

| | | | |
|---|---|---|---|
| 4,760,515 | 7/1988 | Malmquist et al. | 710/121 |
| 5,195,089 | 3/1993 | Sindhu et al. | 370/235 |
| 5,426,765 | 6/1995 | Stevens et al. | 711/131 |
| 5,440,698 | 8/1995 | Sindhu et al. | 395/200.55 |
| 5,506,971 | 4/1996 | Gullette et al. | 710/116 |
| 5,704,058 | 12/1997 | Derrick et al. | 711/168 |
| 5,768,548 | 6/1998 | Young et al. | 710/129 |
| 5,884,027 | 3/1999 | Garbus et al. | 709/250 |

*Primary Examiner*—Eddie P. Chan
*Assistant Examiner*—Hong Kim

[57] ABSTRACT

A multiple client memory arbitration system to arbitrate client access to a single cache memory in an I/O controller device having at least one internal client in addition to the possibility of at least one external client. The system includes an arbitrator, the ability to determine a configuration type for the I/O controller device selected from a group of configuration types consisting of an unknown device configuration, single device configuration, multiple device master configuration, and multiple device slave configuration, the ability to configure the arbitration device based on a configuration type, the ability to refresh the cache memory independent of the configuration type, and the ability to execute failover control of the cache memory in an event of an I/O controller device failure in a multiple arbitration device configuration.

6 Claims, 13 Drawing Sheets

MULTIPLE CLIENT MEMORY ARBITRATION SYSTEM CAPABLE OF OPERATING MULTIPLE CONFIGURATION TYPES

RELATED APPLICATION

The present application is related to the subject matter of U.S. patent application Ser. No. 08/821,783, filed Mar. 21, 1997, the text of which is incorporated herein to the same extent as though the text were actually present.

FIELD OF THE INVENTION

This invention relates to the field of memory arbitration, and in particular to a configurable master/slave arbitration system having active/passive failover support for a single memory that serves multiple clients in an Input/Output (I/O) bus bridge configuration.

PROBLEM

Many situations exist in computing systems where there are multiple clients of a single memory. One such situation is in a bridge, also known as an I/O bus bridge, that Interconnects two high-performance high-bandwidth I/O buses. The reason an I/O bus bridge can have multiple clients of a single memory is because the bridge includes a single cache memory that is a bidirectional buffer between the attached I/O busses, and there are multiple processes and/or engines within the I/O bus bridge that operate the bridge by way of the single cache memory. Each of the multiple processes and/or engines within the I/O bus bridge are an internal client of the single cache memory.

However, there are several reasons why existing I/O bus bridges perform below the maximum bandwidth capacity B of the I/O busses that are connected by the bridge. The reason most central to the topic of the present invention is that existing I/O bus bridges implement inefficient cache memory access arbitration schemes that adversely impact bridge performance in configurations where multiple clients share a single cache. Although implementing more than one cache memory may appear to eliminate the need for memory arbitration entirely, the time required to transfer data between a first cache to a second cache adversely impacts the overall performance of the bridge to an extent that the bridge functions at less than the bandwidth capacity of the busses it connects.

Further complicating memory arbitration among the multiple internal clients of a single cache memory is where there exists at least one external client for the single cache memory in a master and slave arbitration configuration. Finally, allowing cache accesses to the single cache memory by multiple internal and/or external clients further emphasizes the need for an efficient memory arbitration system to avoid access lockouts and/or other undesirable access collisions among the multiple clients of a single cache memory.

Another solution to allowing access to a single cache memory by multiple clients is to issue fixed length or timed memory access allotments to each client. However, this solution is undesirable because certain of the time slots would be wasted if a given client has no need to access the single memory and certain of the clients would not have the access they require because their time slot is too infrequent or inadequate in size.

Another solution to allowing access to a single cache memory by multiple clients is to time slice a fixed amount of bandwidth to each client. However, this solution is inadequate because the scheme is not efficient enough to allow any of the clients to keep up with higher speed busses or to adequately support refresh demands.

For these reasons, there exists an ongoing need for a high-performance cache memory access arbitration system in a low latency I/O bus bridge that operates at a bandwidth capacity of at least B if not 2B or greater. A solution to this problem has heretofore not been known prior to the invention as disclosed and claimed herein.

SOLUTION

The above identified problems are solved and an advancement achieved in the field in view of the multiple client memory arbitration system of the present invention. The multiple client memory arbitration system arbitrates client access to a single cache memory in an I/O controller device having at least a plurality of internal clients in addition to the possibility of at least one external client. The system includes an arbitrator, a means for determining a configuration type for the I/O controller device selected from a group of configuration types comprised of an unknown device configuration, single device configuration, multiple device master configuration, and multiple device slave configuration, a means for configuring the arbitrator based on the configuration type, a means for refreshing the cache memory independent of the configuration type, and a means for executing failover control of the cache memory in an event of an I/O controller device failure in a multiple device configuration.

Determining the configuration type includes designating a field in a register of the I/O controller to represent one of the configuration choices. There exists a means for programming the field with any one of the configuration types, and a means for testing the field at initialization time to identify the configuration type. Where an unknown device configuration is specified in the configuration field, there exists a means for preventing internal client and external client access to the cache memory. Where a configuration type of a single device configuration is specified, there exists a means for the arbitration device to limit access to the cache memory to only clients internal to the I/O controller itself. Where a configuration type of a multiple device master configuration is specified, there exists a means for arbitrating access to the cache memory among the plurality of internal clients of the I/O controller and at least one external client that is operationally independent of the I/O controller but has access to the cache memory. Where a configuration type of a multiple device slave configuration is specified, there exists an external master that controls access to the cache memory, in addition to a means for arbitrating requests for access to the cache memory from among said plurality of internal clients of the I/O controller, and a means for requesting access to the cache memory by way of the external master on behalf of one of the plurality of internal clients.

The failover feature exists in multiple device configurations where it is necessary for a first arbitrator to take control of the cache memory because the second arbitrator fails to respond to refresh requests within a specified time limit. The failover feature includes a first means for identifying a failure of a slave arbitrator by a master arbitrator, a second means for identifying a failure of a master arbitrator by a slave arbitrator, a means for disabling any client external to the I/O controller having the cache memory local thereto, and a means for continuing an operational state of the I/O controller having the cache memory local thereto in the single device configuration.

Additional features and details of the multiple client memory arbitration system of the present invention are illustrated and made clear as disclosed and claimed in the remaining sections of this document.

Figure 1:
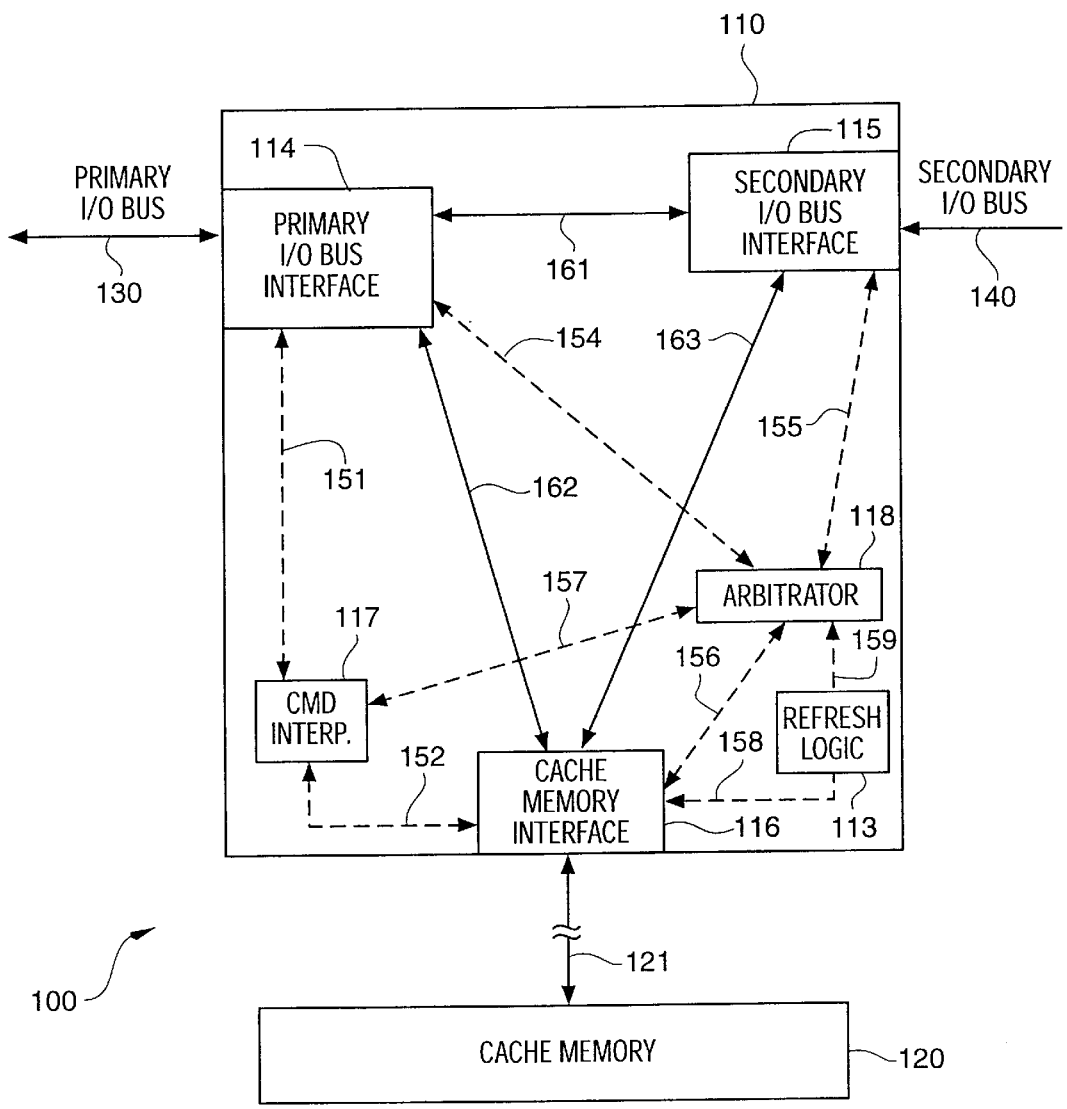
FIG. 1 illustrates a system level example of an arbitration device for multiple clients in an I/O bus bridge environment between a primary I/O bus and a secondary I/O bus.

DETAILED DESCRIPTION
Example Arbitration Device Implementation—FIGS. 1

FIG. 1 illustrates a system level block diagram of an I/O controller configuration 100. The I/O controller configuration 100 includes an I/O bus bridge 110 that contains an arbitration device 118 that is the focus of the present invention. In one preferred embodiment, the multiple client memory arbitration system of the present invention is embodied in an I/O bus bridge. However, an I/O bus bridge is only one example of a device where multiple internal and/or external clients share a single cache or cache memory. Illustrating the present invention in the context of an I/O bus bridge implementation is for preferred embodiment and best mode illustration purposes only and is not a limitation on the applicability of the underlying invention as claimed to other memory arbitration applications.

An I/O bus bridge is an interface bridge that joins two I/O busses. The bridge is typically an integrated circuit implementation that supports a high-speed data path between two independent I/O busses and whose primary function is to transfer data between the two I/O busses. Other more generic names for I/O buses can include expansion bus, channel, and I/O channel. An I/O bus itself is a high-speed data path between at least two components in a computing system.

The I/O bus bridge 110 includes a primary I/O bus interface 114 to a primary I/O bus 130 and a secondary I/O bus interface 115 to a secondary I/O bus 140. The primary I/O bus interface 114 can also include or supply control access to a high-level embedded CPU or bridge controller whose function is to identify and coordinate simultaneous I/O transactions across the I/O bus bridge 110 and to communicate read/write commands to command interpreter 117 for actual read/write control of data to and from cache memory 120. Both I/O bus interfaces 114–115 provide write posting and read pre-fetching buffers for all bridge transactions to facilitate coherency and consistency of bidirectional transactions across the I/O bus bridge 110.

Command path 161 connects the primary bus interface 114 and the secondary bus interface 115. The command path 161 carries the read/write transmission information only between the primary I/O bus 130 and the secondary I/O bus 140. First data path 162 and second data path 163 connect a cache memory interface 116 to the primary bus interface 114 and the second bus interface 115 respectively. The first data path 162 and second data path 163 carry the data only for each read/write transmission between the primary I/O bus 130 and the secondary I/O bus 140. Although the first data path 162 and second data path 163 are ideally the same word-size as the attached busses 130 and 140, the first data path 162 and the second data path 163 can independently buffer incoming data from the respective busses as needed to facilitate the most efficient write operation of a burst of incoming data to cache memory 120.

One important aspect of the I/O bus bridge 110 is that the first data path 162 and second data path 163 are independent read/write paths to and from cache memory 120 by way of cache memory interface 116. Dual port access to cache memory 120 facilitates concurrent reads and writes to and from cache memory interface 116 at a bandwidth capacity that is at least equal to the bandwidth B of the attached busses and can be as efficient as 2B or 4B beyond the bandwidth capacity of the attached busses.

I/O busbridge 110 is a multipurpose memory interface that primarily supports dual port simultaneous independent read/write memory access to cache memory 120. The cache memory interface 116 takes timing off an independent memory clock and operates asynchronously with respect to primary I/O bus 130 and secondary I/O bus 140 sides. The interface can be one of the points of support for fault tolerant features including battery backup as needed for primary power failures. The cache memory interface 116 in the preferred embodiment supports Error Correction Coding (ECC) and a shadow memory bank option.

Cache memory 120 is a standard off-the-shelf synchronous data memory bank that is either internal or external to I/O bus bridge 110 and is operatively connected to the I/O bus bridge 110 by memory bus 121. In the single device configuration 100 of the present illustration, whether the cache memory 120 is internal or external to I/O bus bridge 110, the cache memory 120 is considered local to the I/O bus bridge 110 and is subject to internal client access as determined by arbitrator 118. In the preferred embodiment, cache memory 120 is an Error Correction Code (ECC) Dynamic Random Access Memory (DRAM), preferably a Synchronous DRAM (SDRAM) 8 byte/72bit Dual In-line Memory Module (DIMM) memory.

The command interpreter 117, also known as the command sequence controller or command executer, executes memory access commands for the I/O bus bridge 110. Command paths 151 and 152 facilitate command communication between the cache memory interface 116 and the I/O busses 130 and 140.

A single arbitration device 118, also known as an arbitration controller or arbitrator, is a device internal to the I/O bus bridge 110 that arbitrates access to cache memory 120 among a plurality of internal clients and at least one external client. The internal clients include, but are not limited to, the primary I/O bus interface 114, secondary I/O bus interface 115, command interpreter 117, cache memory interface 116, and memory refresh logic 113. Each of the internal clients 113–117 share access to cache memory 120 according to the arbitration logic of arbitration device 118. An introduction to external client details are disclosed in the text accompanying FIGS. 2–4.

Each internal client 113–117 is operatively connected to arbitration device 118 by arbitration leads 154–159. Each arbitration lead 154–159 is includes at least one lead that can carry signals such as a request signal REQ, a grant signal GNT, and a burst count signal COUNT[n:0]. A REQ signal is an input to the arbitration device 118 from a given internal client and the signal is enabled for the duration of time an internal client is requesting access to cache memory 120. A GNT signal is an output from the arbitration device 118 to a given internal client and the signal is enabled when the internal client is granted access to cache memory 120. The COUNT signal is an input to the arbitration device 118 from a given internal client such as the cache memory interface 116, and the signal is used to specify the number of memory transfers required by a given internal client. A memory transfer is a single read/write operation to/from the cache memory 120. The count value can be changed dynamically as the client's internal buffers are being emptied by the cache memory interface 116 concurrently with being filled by either the primary I/O bus interface 114 or the secondary I/O bus interface 115. Once the count value falls below the cache memory transfer latency value that was previously communicated to the arbitration device 118 from the cache memory 120, the client's access to the cache memory 120 is terminated even if the client's burst count has not reached zero.

Figure 2:
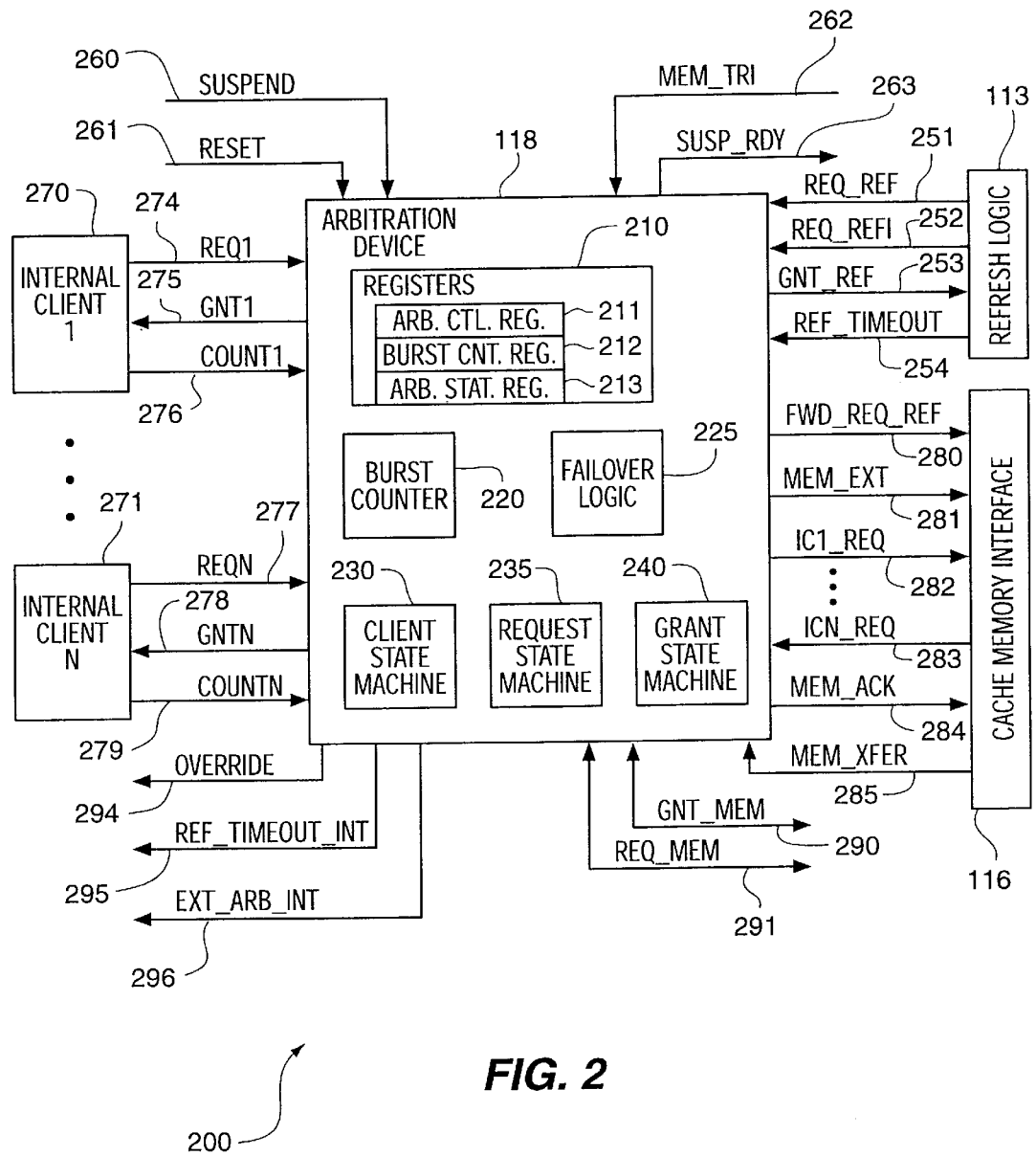
FIG. 2 illustrates architectural details of an arbitration device in block diagram form.

Arbitration Device Architecture—FIG. 2

FIG. 2 illustrates an architectural overview 200 of the multiple client memory arbitration device 118 in block diagram form. The various components and leads illustrated in architectural overview 200 exist for any arbitration device 118 regardless of its operational configuration as a master or a slave for example. However, whether each of the components and leads are active or inactive at any given time can vary among the different configuration types.

The arbitration device 118 itself is a logic engine comprised of registers and gated logic that are also referred to as components and/or logic blocks. Key components and/or logic blocks of arbitration device 118 include registers 210, burst counter 220, failover logic 225, client state machine 230, request state machine 235, and grant state machine 240. Registers 210 includes hardware registers 211–213 for use as arbitration device control and/or status. The arbitration control register 211 contains configuration and timing information including, but not limited to, a suspend enable bit, an asynchronous external interface bit, an external pulse width field, a failover enable bit, and a configuration field. The suspend enable bit is used to indicate whether or not to place the cache memory 120 in power down mode in situations such as when a primary power supply to the 110 controller 110 itself has been lost. The asynchronous external interface bit is used to determine whether the arbitration signals received from an external arbitration device must pass through synchronization logic of arbitration device 118 prior to use by the arbitration device 118. The external pulse width field is used to determine the minimum pulse width in clock cycles for the most reliable signal from an external interface or device. That is, the external pulse width field defines the minimum number of clock cycles that should occur between two individual like type external interface signals to maximize reliable detection between the signal being enabled a first time from a second or subsequent times. The actual width of a pulse is measured from the falling edge of the signal to the subsequent rising edge of the same signal. The failover enable bit is used to signal the need for a master or slave configured arbitration device 118 to execute failover procedures. The configuration field defines the present device configuration by a unique combination of bits in the field.

The burst count register 212 contains programmable burst count values for certain of the internal clients served by the arbitration device 118. A burst count is the number of words transferred during a single cycle when a client is granted access to the cache memory 120.

The arbitration status register 213 contains status and/or diagnostic information for the arbitration device 118 that includes, but is not limited to, a suspend status bit, a failover status bit, and an actual configuration field. The suspend status bit is used to indicate the completion or failure to complete a suspend operation due to the suspend bit in the arbitration control register 213. The failover status bit is used to indicate the completion or failure to complete a failover operation due to the failover bit in the arbitration control register 213. The actual configuration field is used to identify the present configuration of arbitration device 118. The actual configuration field of the arbitration status register 211 is typically identical to the configuration field of the arbitration control register 213 except after a failover has occurred when the configuration field of the arbitration control register 213 reflects the configuration prior to failover and the actual configuration field of the arbitration status register 211 reflects the configuration following failover.

The burst counter 220 contains the gated logic and circuitry necessary to count the number of data transfers that occur between a given client and the cache memory 120. Default limits can be set for the number of data transfers a given client can have at a given time, however, certain internal clients can have programmable burst limits that are different from the default limit as previously disclosed in the text relating to the programmable burst count register 212. Prior to a typical internal client proceeding with a cache memory 120 access, the burst counter 220 is loaded with a value from the burst count register 212 that corresponds to the burst count for the given client. As the client's data transfer to or from cache memory 120 proceeds, the burst counter 220 decrements the client's burst count so that the arbitration device 118 knows when the cache memory 120 access for that client must terminate. The transmitting client is terminated when the burst count falls below the latency county supplied by the cache memory interface 116. In the mean time while the present client has access to cache memory 120, the arbitration device 118 proceeds to identify and prepare for the next client that is requesting access to cache memory 120. Note, however, that refresh clients are internal clients that access cache memory 120 without burst counter 220 involvement. The refresh logic 250 that plays the dual role of normal refresh client (REF) and the refresh immediate client (REFI) have no need for a burst count because a refresh operation is allowed to take whatever time is required to complete successfully.

The failover logic block 225 contains the gated logic and circuitry necessary to detect and execute a failover operation in a configuration having master and slave arbitration devices. Events that are sufficient to result in a failover include, but are not limited to, where an external arbitration device prevents proper cache memory 120 refresh operations from being performed, or where an internal or external client is maintaining control of the cache memory interface 116 for a longer than permitted period of time, or if an external master arbitrator fails to grant cache memory 120 access to a slave arbitration device for a longer than permitted period of time. Once a sufficient failure to refresh memory is detected, the refresh logic 250 notifies the arbitration device 118 of the timeout and the arbitration device 118 executes the failover.

The arbitration device 118 contains the gated logic and circuitry necessary to execute several cooperative state machines including, but not limited to, a client state machine 230, a request state machine 235, and a grant state machine 240. The client state machine 230 is a part of the arbitration device engine that determines the order in which the multiple clients of arbitration device 118 will receive access to cache memory 120. The request state machine 235 is a part of the arbitration device engine that forwards client requests for access to cache memory 120 from the arbitration device 118 to the cache memory interface 116. The grant state machine 240 is a part of the arbitration device engine that delivers the grant of access to cache memory 120 from the cache memory interface 116 to client receiving the access. Note that although multiple clients may be requesting access to cache memory 120 concurrently, only one client receives access to cache memory 120 at a time.

The arbitration device 118 is operatively connected to n internal clients 270–271 respectively by way of signal leads that are unique to each client including, but not limited to, a request signal lead (REQ), grant signal lead (GNT), and burst count lead (COUNT) 274–276 and 277–279 respectively. Arbitration device 118 is also operatively connected to the refresh logic engine 113 and cache memory interface 116. Signal leads between refresh logic engine 113 and arbitration device 118 include, but are not limited to, request normal refresh signal lead (REQ_REF) 251, request refresh immediate signal lead (REQ_REFI) 252, grant refresh signal lead (GNT_REF) 253, and refresh timeout signal lead (REF_TIMEOUT) 254. The REQ_REF signal lead 251 is used to communicate the need for access to cache memory 120 for a normal memory refresh operation. The REQ_REFI signal lead 252 is used to communicate the need for access to cache memory 120 for an immediate memory refresh operation. The GNT_REF signal lead 253 is used to communicate that access to cache memory 120 is granted to the refresh logic engine 113. The REF_TIMEOUT signal lead 254 is used to communicate to the arbitration device 118 that a predetermined amount of time has elapsed since the last memory refresh operation.

Signal leads between arbitration device 118 and cache memory interface 116 include, but are not limited to, a forwarded refresh request (FWD_REQ_REF) 280 on behalf of the refresh logic engine 113, a forwarded external memory request (MEM_EXT) 281 on behalf of an external client, an internal client memory request (IC_REQ) 282–283 on behalf of individual ones of the internal clients 270–271, memory access acknowledgment (MEM_ACK) 284 used to acknowledge receipt of a request for access to cache memory 120 from any client, and memory transfer lead (MEM_XFER) 285.

Signal leads between arbitration device 118 and an arbitrator that is external to arbitration device 118 include, but are not limited to, grant memory access lead (GNT_MEM) 290 used by the arbitration device 118 to signal the grant of cache memory 120 access to an external client, and request memory access lead (REQ_MEM) 291 used by an external client to signal a request for access to cache memory 120. Additional signal leads from arbitration device 118 to an external arbitrator include, but are not limited to, override signal lead (OVERRIDE) 294 to signal an external arbitrator to shut off during a failover operation, a refresh timeout interrupt lead (REF_TIMEOUT_INT) 295 to signal a refresh timeout error, and an external arbitrator error interrupt lead (EXT_ARB_ERR_INT) 296 to signal an external arbitrator error.

The suspend lead (SUSPEND) 260 is used by a high level host system to signal the arbitration device 118 the immanence of a power failure. The reset lead (RESET) 261 is used by a host of the arbitration device 118 to signal the arbitration device 118 to come out of a suspend state. The suspend ready lead (SUSP_RDY) 263 signals the cache memory interface 116 and the internal clients 270–271 that it is time to enter the suspend state due to a power failure. The memory tri-state lead (MEM_TRI) 262 is the override input to arbitration device 118 from an external arbitrator.

Figure 3:
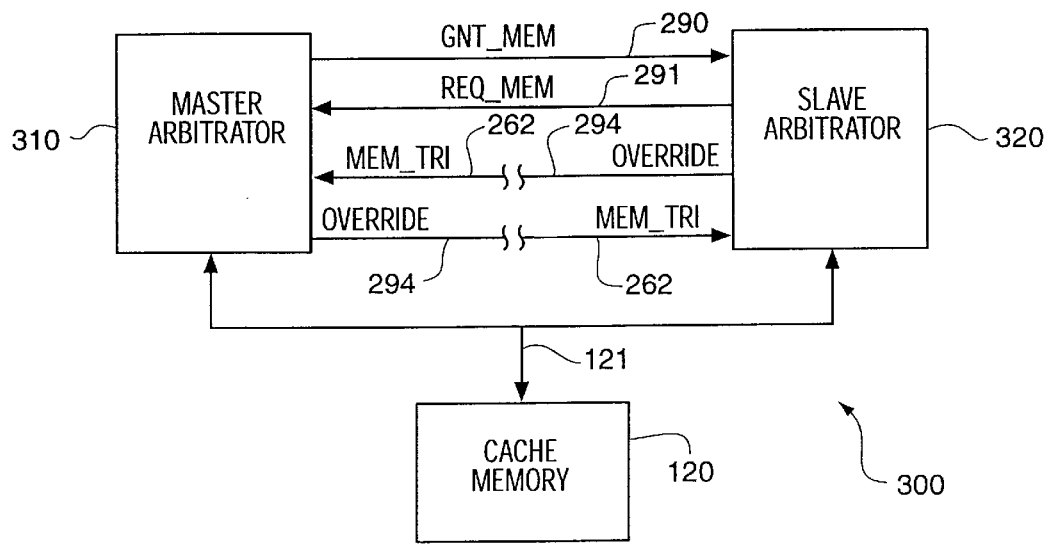
FIG. 3 illustrates a multiple arbitration device configuration in block diagram form having a master arbitrator and a slave arbitrator.
Figure 4:
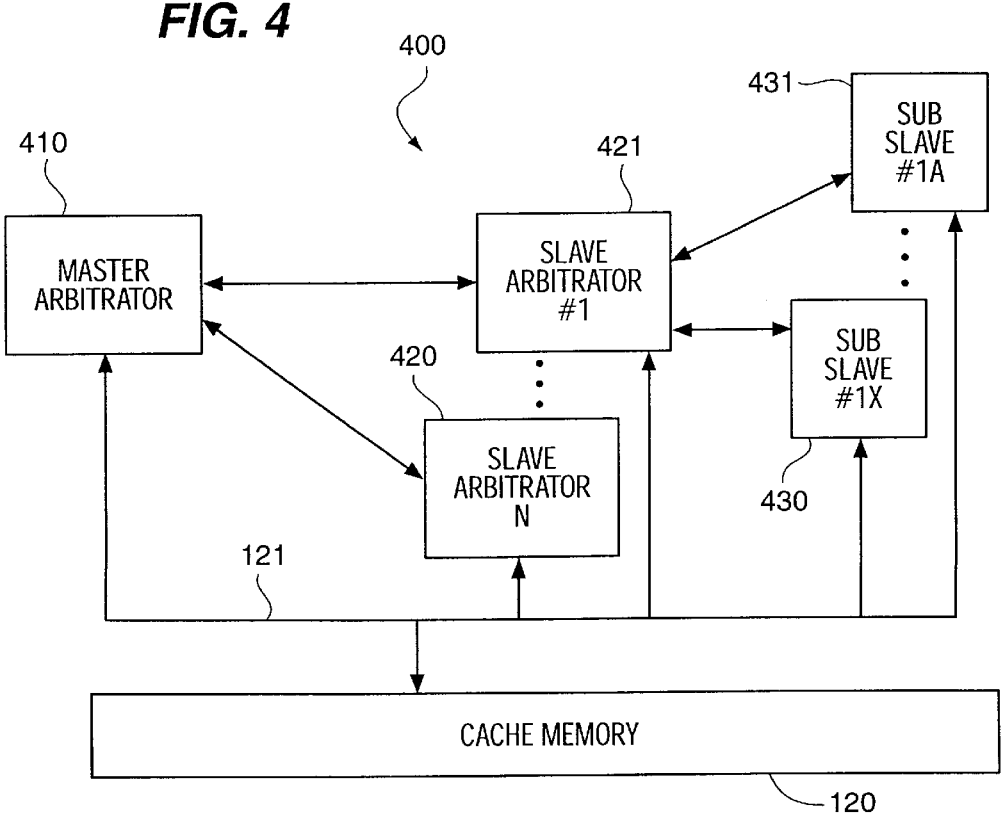
FIG. 4 illustrates a multiple arbitration device configuration in block diagram form having a master arbitrator and multiple slave arbitrators

Master/Slave Arbitration Device Configurations—FIGS. 3–4

The multiple client arbitration device 118 can be configured as a single arbitration device that serves only internal clients as illustrated in FIG. 1. However, the same multiple client arbitration device 118 be configured to serve its internal clients in addition to performing as either a master arbitrator or a slave arbitrator in concert with an external arbitrator as disclosed in the following text accompanying FIGS. 3–4. An example of an arbitration device other than the multiple client arbitration device 118 that could function as either a master or slave arbitration device opposite the multiple client arbitration device 118 of the present invention, is a processor that requires access to a memory but does not have a memory of its own.

FIG. 3 illustrates a basic master/slave configuration 300 having a master arbitrator 310, a slave arbitrator 320, and a cache memory 120 shared by both arbitrators 310 and 320 by way of memory bus 121. The slave arbitrator 320 communicates a request for memory access to the master arbitrator 310 by way of REQ_MEM lead 291. Similarly, the master arbitrator 310 communicates a grant of memory access to the master arbitrator 320 by way of GNT_MEM lead 290. In addition both arbitration devices 310 and 320 have an outgoing OVERRIDE lead 294 and incoming MEM_TRI lead 262 for failover purposes as previously disclosed in the text accompanying FIG. 2. These basic leads provide adequate communication between the master arbitrator 310 and slave arbitrator 320 so that both devices can function as a coherent system of multiple clients sharing a single cache memory 120.

Note that the multiple client arbitration device 118 of the present invention can be configured to function as either the master arbitrator 310 or the slave arbitrator 320. However, if the multiple client arbitration device 118 is configured as a master in the present preferred embodiment, only one slave arbitration device 320 can be supported due to the single pair of external device grant and request leads. Additional pairs of external device grant and request leads are required for each client external to the multiple client arbitration device 118 that is configured as a master.

FIG. 4 illustrates one configuration example of an expandable master/slave hierarchical configuration 400 that includes three levels of arbitrators 410–431. The first level or root level of the hierarchical configuration 400 includes a master arbitrator 410 that serves at least one slave arbitrator 420–421. The second level of the hierarchical configuration 400 includes a slave arbitrator 420 and a sub-master arbitrator 421 where the sub-master arbitrator 421 has at least one slave arbitrator 430–431. The third level of the hierarchical configuration 400 includes at least one slave arbitrator 430–431. Each of the arbitrators 410–431 share access to cache memory 120. The multiple client memory arbitration device 118 of the present invention as illustrated in FIG. 2, can operate within the hierarchical configuration 400 as any one of the slave arbitrators 420 and 430–431. However, there are many other alternative configurations possible within the context of the exemplary hierarchical configuration 400 of which the multiple client arbitration device 118 can play a role. Some examples of the alternative configurations are disclosed below for discussion and illustration purposes.

One alternative configuration could include only a master arbitrator 410 and a slave arbitrator 420 that share access to a single cache memory 120 as previously disclosed in the text accompanying FIG. 3. Another alternative configuration could include only a master arbitrator 410, a sub-master arbitrator 421, and a plurality of sub-slaves 430–431 where individual duplicates of the multiple client arbitration device 118 of the present invention could function as the master arbitrator 410 and/or any one of the slave arbitrators 430–431.

Figure 5:
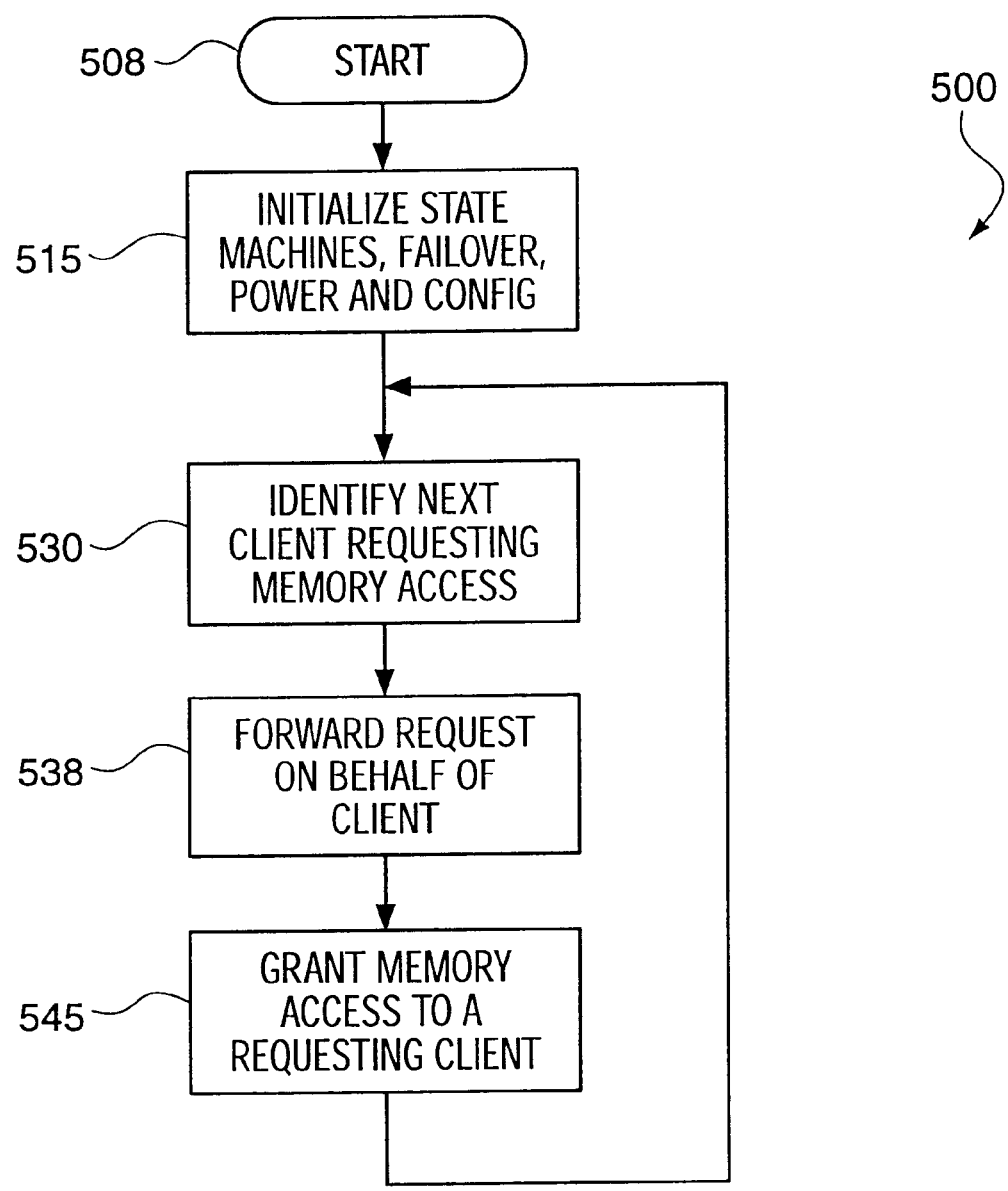
FIG. 5 illustrates an overview of the multiple client memory arbitration system operational steps in flow diagram form.
Figure 6:
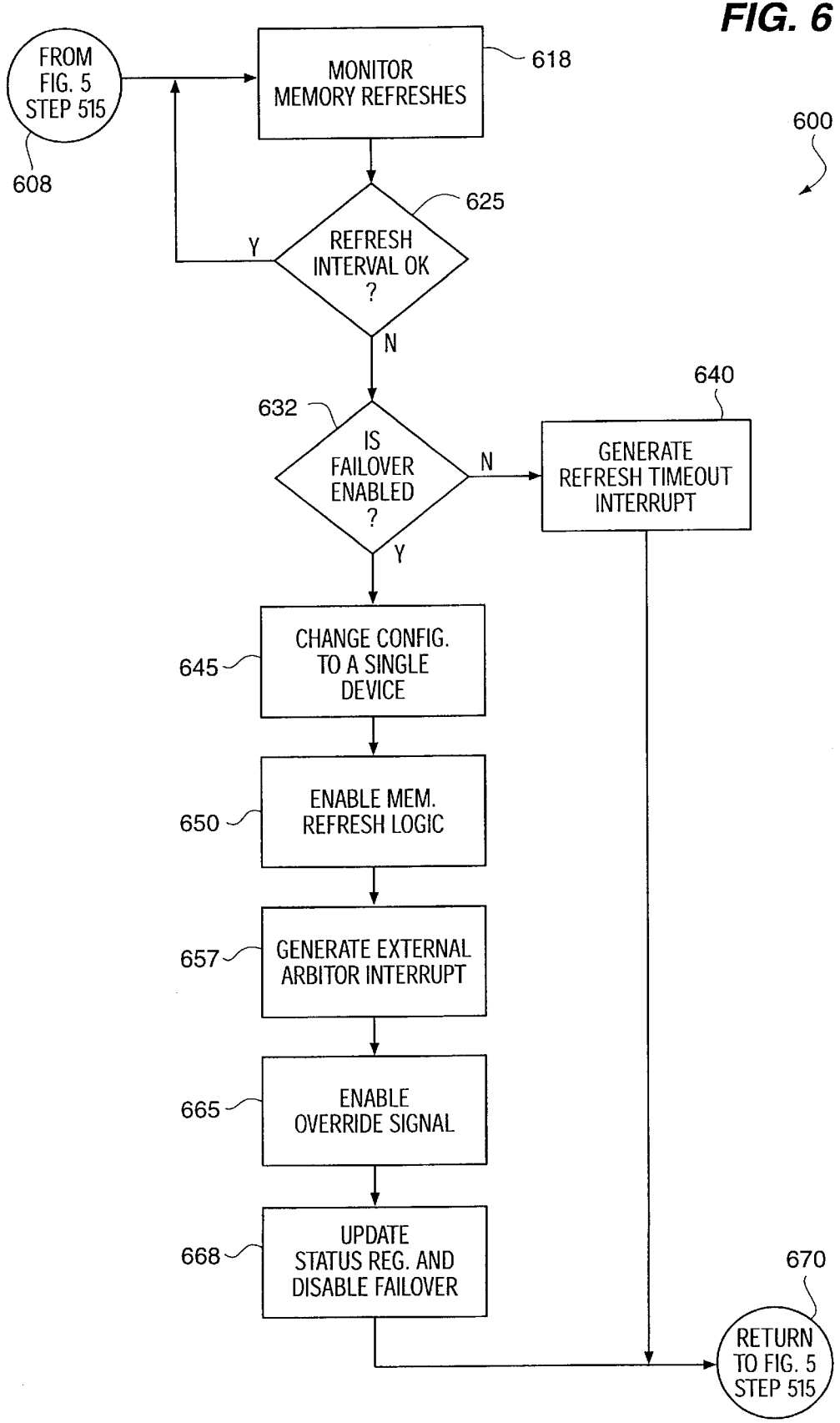
FIG. 6 illustrates details of the failover system operational steps in flow diagram form.
Figure 7:
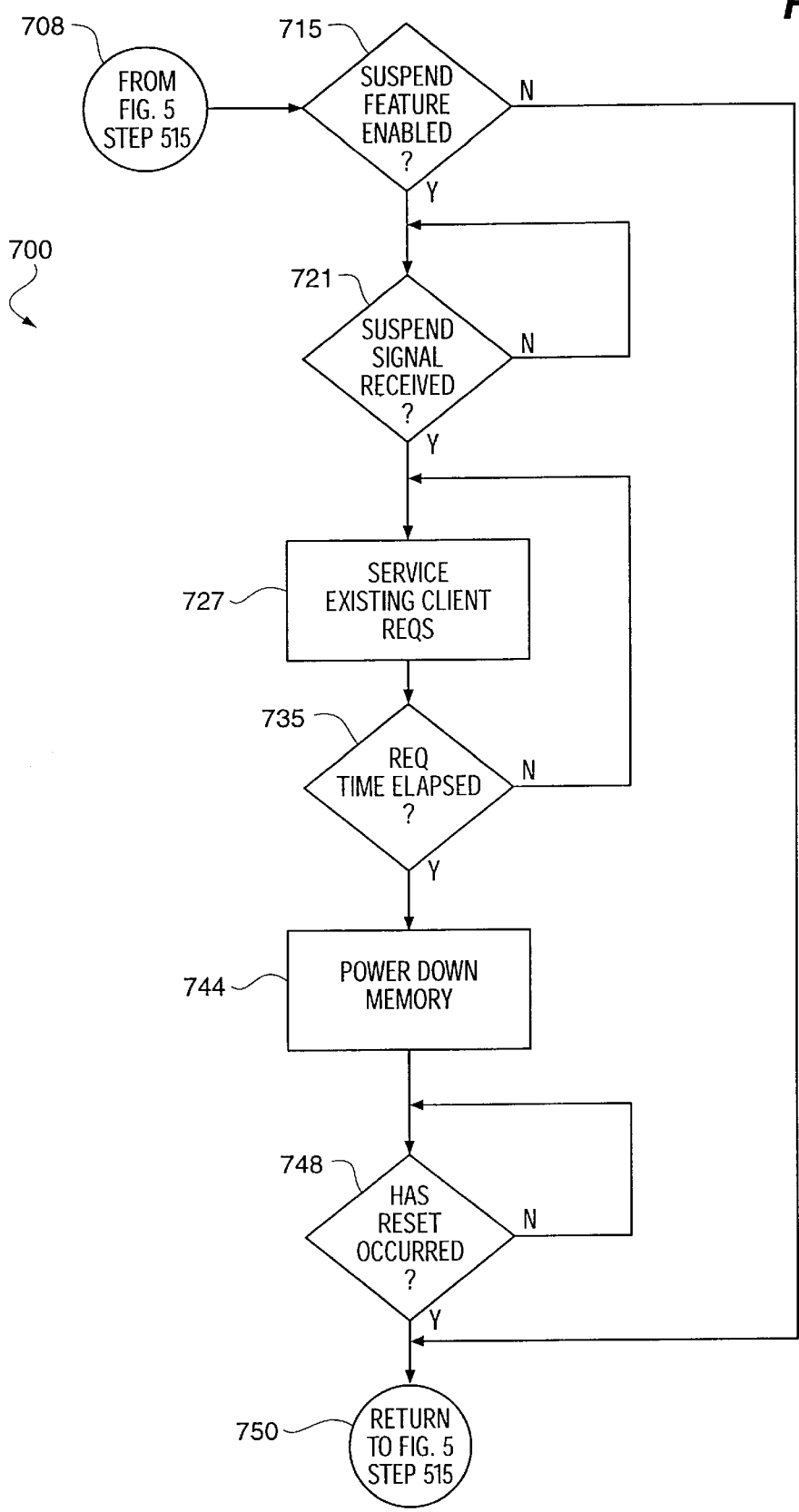
FIG. 7 illustrates details of the power failure detection and suspend procedures operational steps in flow diagram form.

Arbitration Device Operational Overviews—FIGS. 5–7

FIG. 5 illustrates an operational overview 500 for the arbitration device 118 in flow diagram form. The operational overview 500 begins at step 508 and proceed to initialization at step 515. Step 515 initialization means that the configuration field of the arbitration control register 211 has been written and the components and/or logic blocks of arbitration device 118 are made ready for operation according to the specified configuration. In addition, the power failure control feature is activated regardless of the configuration type and the failover control feature is activated for a master or slave configuration type. Operational details of the failover control feature are disclosed in the text accompanying FIG. 6. Operational details of the power failure control feature are disclosed in the text accompanying FIG. 7. Note that once the failover control feature and/or the power failure control feature are enabled, either feature can interrupt the normal processing of operational overview 500 steps at any time.

At step 530, the client state machine 230 of the arbitration device 118 identifies a next client that is requesting access to cache memory 120. Operational details of the client state machine 230 are disclosed in the text accompanying FIGS. 8–9. At step 538, the request of the identified client is forwarded to the cache memory interface 116 by the request state machine 235 and an acknowledgment of the request is returned to the arbitration device 118 by the cache memory interface 116. Operational details of the request state machine 235 are disclosed in the text accompanying FIGS. 10–11. At step 545, a grant signal is enabled by the grant state machine 240 for the requesting client that is now obtaining access to the cache memory 120 so that the requesting client can proceed to read/write to the cache memory 120. Operational details of the grant state machine 240 are disclosed in the text accompanying FIGS. 12–13. Processing continues to service client requests for access to cache memory 120 by returning to step 530.

Operationally, an internal client memory access request occurs when an internal client enables its request signal lead (REQ) to notify the arbitration device 118 of the request. The REQ signal lead stays enabled until the signaling client no longer wants access to the cache memory 120. When the arbitration device 118 determines that a given client can have its requested memory access, the arbitration device 118 enables the client's grant signal lead (GNT) for the duration of time access is granted. If the internal client completes its read/write operations while the grant signal is enabled, then the request signal is disabled indicating to the arbitration device that the grant signal can also be disabled for the present client. Alternatively, if the transmitting client reaches its burst count limit prior to completing its read/write operation, then the arbitration device will disable its grant signal to the present client to terminate the client's transmission and the client's request signal remains enabled so the arbitration device 118 will once again grant the requested memory access at the client in due course.

For an arbitration device 118 that is configured as the master in control of cache memory 120, internal client memory access requests are handled in the manner previously disclosed, and external client memory access requests, also known as slave requests, are arbitrated as stated below. A slave arbitration device communicates a memory access request to the master on behalf of one of the slave's internal clients, by the slave enabling its request memory signal lead (REQ_MEM) for the duration of time the memory access is being requested. When the requested access is granted, the master enables the grant memory signal lead (GNT_MEM) to notify the slave that memory access has been granted. However, just prior to granting memory access to the slave, the master enables its MEM_EXT lead 281 to notify its cache memory interface 116 that control of the cache memory 120 is being relinquished to an external device for a period of time. Similarly, just prior to relinquishing control of the cache memory 120, the slave arbitration device enables its MEM_EXT lead 281 to notify its cache memory interface 116 that control of the cache memory 120 is being relinquished to an external device, in this case the master, for a period of time.

Finally, there are two options for the type of external arbitration signal synchronization that can be used between a master and a slave, including synchronous and asynchronous. The synchronization type is determined by the asynchronous external interface bit in the arbitration control register 211. The default synchronization type is asynchronous and is used when the propagation delay between the master and slave arbitrators is small. However, if the delay is more than about one half of a clock period, the synchronous option should be used by clearing the asynchronous external interface bit in the arbitration control register 211. Synchronous operations occur by using a master based synchronizer to align the incoming master arbitration signals to a clock in the master. The slave arbitration device clocks off the same clock as the master. Similarly, if an arbitration device configured as a slave is set for synchronous operation, incoming arbitration signals to the slave device are synchronized to the slave device clock.

FIG. 6 illustrates details of the operational steps 600 for the failover feature in flow diagram form. The failover feature is effective for the arbitration device 118 that is in either the master or the slave configuration. The purpose of the failover feature is to detect the failure of an external arbitrator and to take appropriate action to insure that the surviving arbitration device remains operational. The operational steps 600 begin at step 608 and represent the details of step 515 of FIG. 5.

At step 618, the arbitration device 118 begins monitoring all memory refresh operations. If it is determined at decision step 625 that the refresh operation of an external arbitrator completes successfully within a predetermined amount of time, then it is assumed that the external arbitrator is fully operational and monitoring continues in the background at step 618 as previously disclosed. Alternatively, if it is determined at decision step 625 that a memory refresh operation has not completed within a predetermined amount of time, then it is assumed that the external arbitrator has failed and processing continues at step 632.

If it is determined at decision step 632 that the failover bit in the arbitration control register 211 is not enabled, then processing continues to step 640. At step 640, the arbitration device 118 generates a refresh timeout error interrupt (REF_TIMEOUT_INT) 295 to notify any local host processor of the situation and processing continues at step 670 by returning to step 515 of FIG. 5. Alternatively, if it is determined at decision step 632 that the failover bit in the arbitration control register 211 is enabled, then processing continues at step 645 to disable the external arbitrator so that arbitration device 118 can continue operating normally.

At step 645, the arbitration device 118 changes the configuration type noted in the arbitration status register 213 from the present configuration to a single device configuration. At step 650, the memory refresh logic is enabled if it is not already enabled so that the lack of a refresh that precipitated the failover can be rectified. At step 657, the arbitration device 118 generates an external arbitration error interrupt to notify the local host processor of the I/O controller 110 of the need to execute failover procedures. At step 665, a signal on the override signal lead (OVERRIDE) 294 is enabled to indicate to the external device to which lead 294 is attached that failover is occurring. The override signal lead 294 is the output from the arbitration device that is engaging the failover operation and the memory tri-state signal lead (MEM_TRI) 262 is the input to the external device being disabled due to the failover operation. The override signal is enabled to avoid contention over the cache memory 120 in the event the failed arbitrator should resume activity on the memory bus 121 once again in the future. At step 668 the arbitration status register 213 is updated to indicate that a failover has occurred and the failover feature is disabled to prevent any subsequent attempt to execute a failover until the entire master/slave configuration is reinitialized. Processing continues at step 670 by returning to step 515 in FIG. 5.

FIG. 7 illustrates details of the operational steps 700 in flow diagram form for the power failure suspend feature. The operational steps 700 begin at step 708 and represent the details of step 515 in FIG. 5. If it is determined at decision step 715 that the suspend feature of arbitration device 118 is not enabled, then processing continues at step 750 by returning to step 515 of FIG. 5. Alternatively, if it is determined at decision step 715 that the suspend feature of arbitration device 118 is not enabled, then processing continues at step 721.

If it is determined at decision step 721 that no suspend signal exists on SUSPEND lead 260 of the arbitration device 118, then the suspend feature remains idle. Alternatively, if it is determined at decision step 721 that a suspend signal exists on SUSPEND lead 260, then processing continues at step 727. Determining if a loss of power is imminent and sending a suspend signal on SUSPEND lead 260 to notify the arbitration device 118, is the function of a board level or other host level type device.

At step 727, the arbitration device 118 begins the power down process by servicing any client requests that existed at the time the suspend signal was received. If it is determined at decision step 735 that a sufficient predetermined amount of time has not elapsed since the last request for memory access was received, then processing continues to service requests for memory access at step 727 as previously disclosed. Alternatively, if it is determined at decision step 735 that a predetermined length of time has elapsed since the last request for memory access was received, then processing continues to step 744.

At step 744, the arbitration device 118 signals the cache memory interface 116 to put the cache memory 120 in power down mode by enabling a signal on the suspend ready signal lead (SUSP_RDY) 263. The SUSP_RDY signal 263 also alerts the I/O bus interfaces 114–115 not to accept any more incoming commands for processing by the I/O bus bridge 110. The suspend state remains in effect until a reset signal is received by the arbitration device 118 on the reset signal lead (RESET) 261. Thus, if it is determined at decision step 748 that no reset signal is received on RESET lead 261, then the arbitration device 118 remains idle. Alternatively, if it is determined at decision step 748 that a reset signal is received on RESET lead 261, then processing continues at step 750 by returning to step 515 of FIG. 5.

Figure 8:
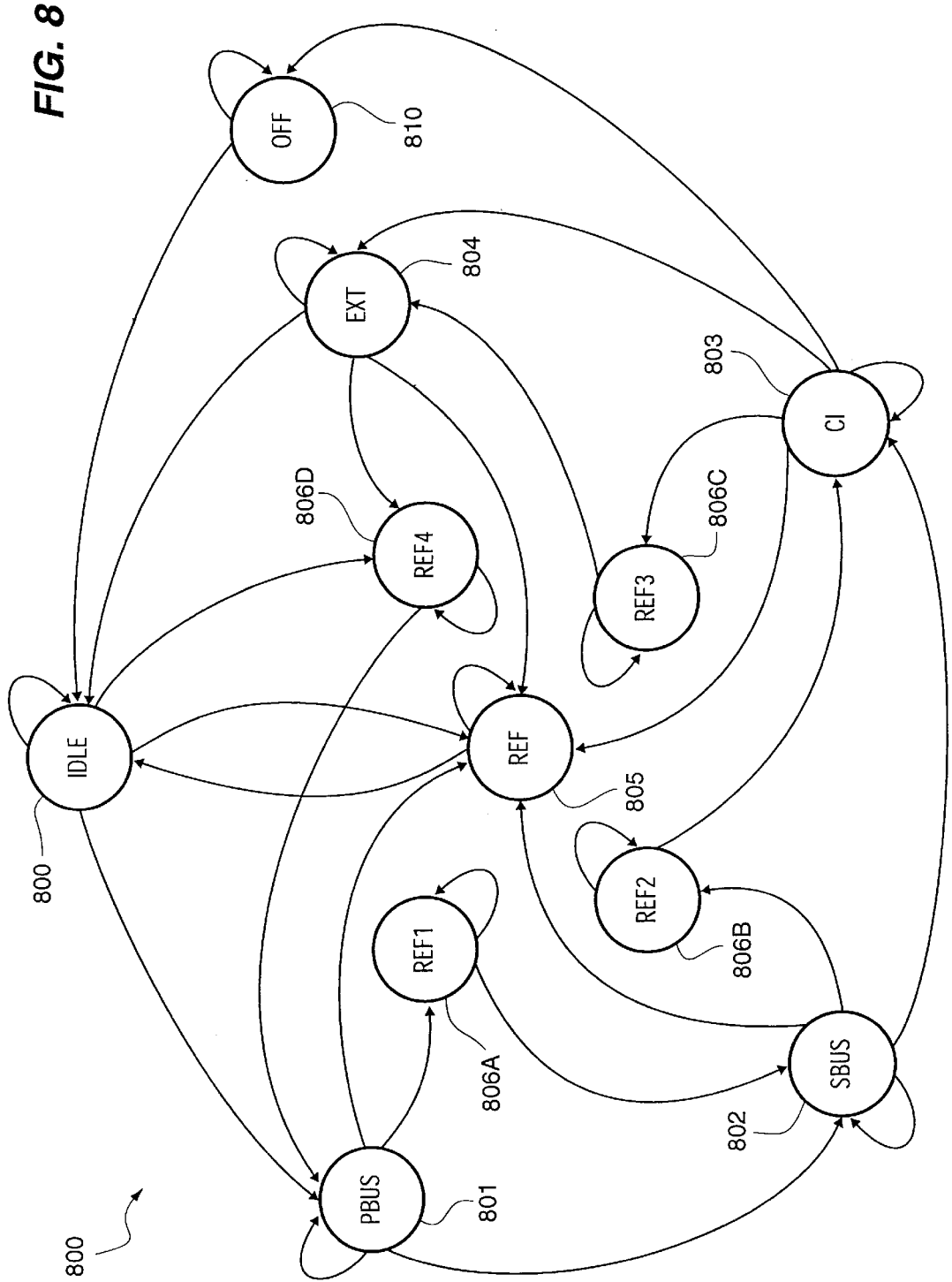
FIG. 8 illustrates an overview of the client state machine logic in state diagram form.
Figure 9A:
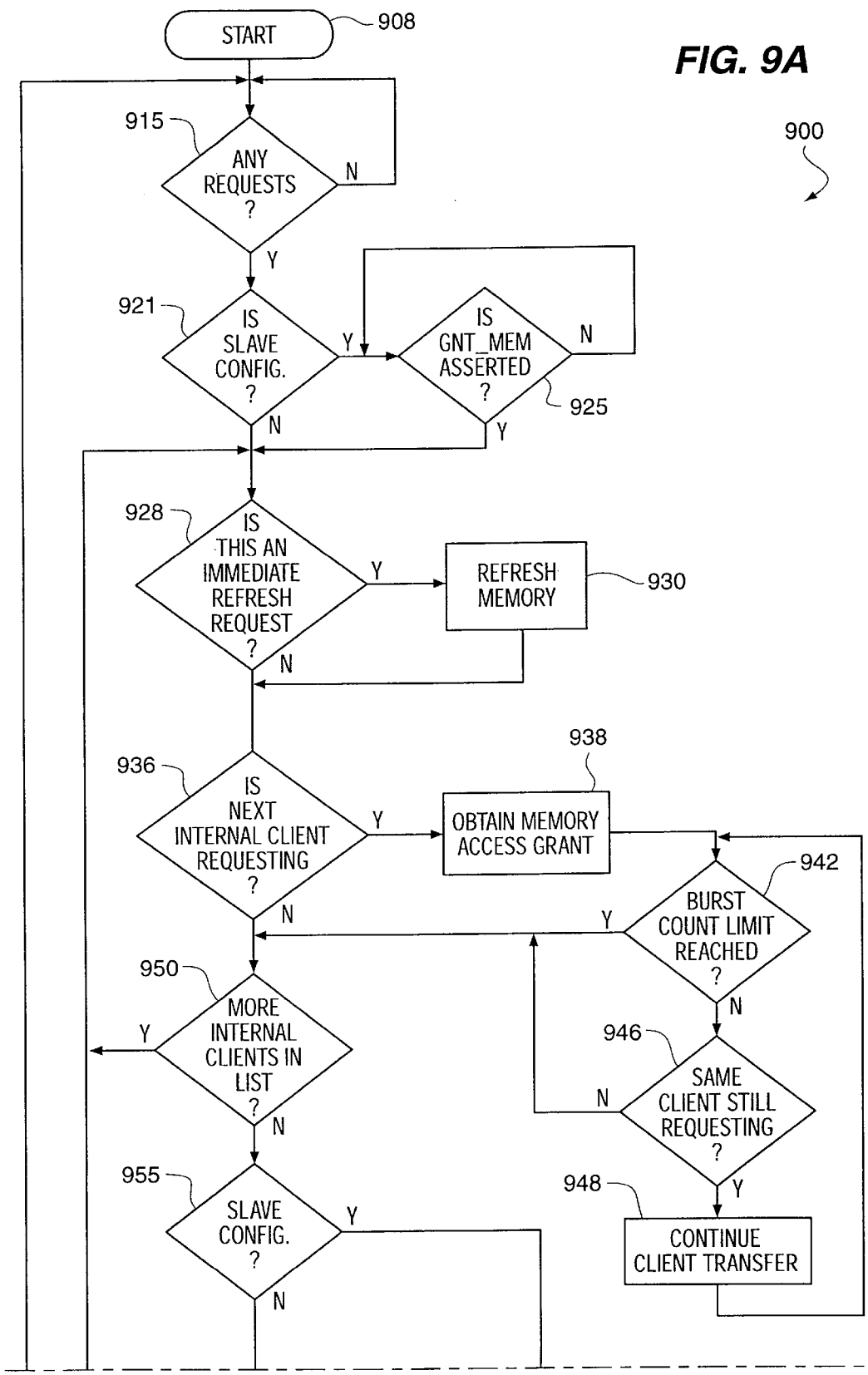
FIGS. 9A and 9B illustrate a generalization of the client state machine logic operational steps in flow diagram form.
Figure 9B:
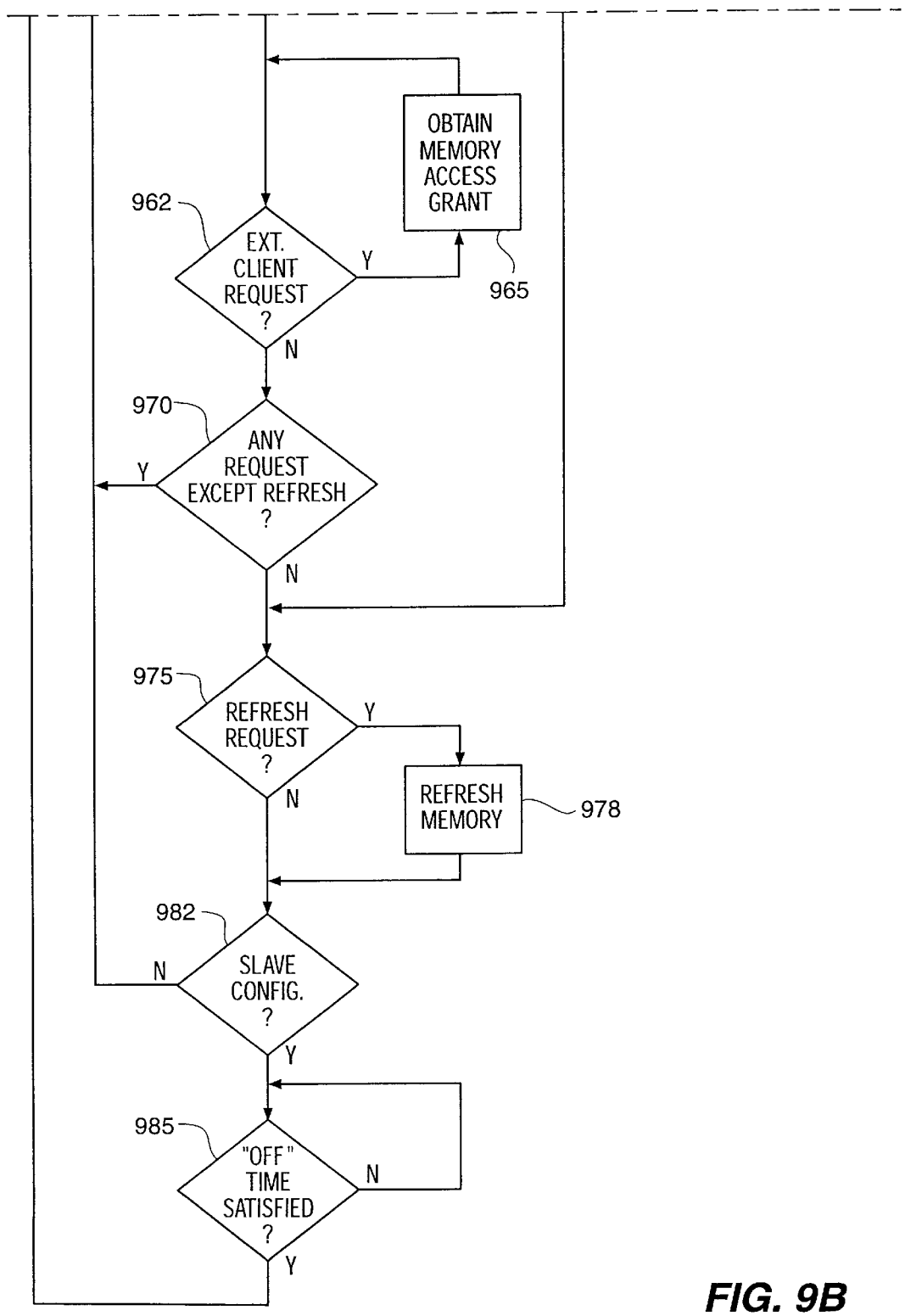

Client State Machine Operational Steps—FIGS. 8–9

FIG. 8 illustrates operational details of the client state machine 230 in the form of a client state diagram 800. The client state diagram 800 can be expanded to include any number of clients, however, the present illustration includes one external client (EXT) 804, and internal clients that include, a primary bus interface client (PBI) 801, secondary bus interface client (SBI) 802, command interpreter client (CI) 803, a normal refresh client (REF) 805, and an immediate refresh client (REFI) represented by the collective states 806a–806d. The collective states 806a–806d are in fact one logical "state" that is illustrated as four actual states for coherent state diagraming purposes only. Additional non-client states in state diagram 800 include an off state 810 and an idle state 811.

Operationally, client state diagram 800 operates under the general principle that the next client to receive memory access consideration depends on which client is presently being served. That is, from any point in the state diagram 800 there exists at least one directed arrow indicating the state or states that could be next client to receive access to cache memory 120. Where more than one directed arrow exists from a given state, the next client to be served is typically determined by the level of priority that exists for a given client. For example, a state change takes place from one client to the next among the several clients 801–804 before returning to the idle state 811.

Refresh operations can alter the order of which state is next within the client state diagram 800. For example, the normal refresh client 805 is the lowest priority client so that if after all other clients 801–804 that are requesting cache memory 120 access have had their turn, the normal refresh client 805 is granted access. When the normal refresh client 805 is finished with its refresh operation, then the idle state 811 is the next state. Alternatively, the immediate refresh client 806a–806d is the highest priority client so that if an immediate refresh is required during the time the present state is any one of the states 811 or 801–804, an appropriate one of the immediate refresh states 806a–806d preempts any other state 811 or 801–804 as the next state. For example if an immediate refresh is requested at the time the secondary I/O bus client state 802 has access to cache memory 120, immediate refresh state 806b preempts the command interpreter client state 803 as the next client to receive access to cache memory 120. When immediate refresh state 806b has completed its refresh operation, then the command interpreter client state 803 is the next state.

The idle state 811 is where the state machine 800 idles until a client request occurs. Cycling through the client states 801–804 allows the state machine 800 to identify which of the clients 801–804 is making the request and initiate the servicing of the request. Note that the EXT client state 804 only exists for an arbitration device configured as a master because the master must give an external slave device an opportunity to have access the cache memory 120 just as the master must give its own internal clients a turn at accessing the cache memory 120. The off state 810 exists only for an arbitration device that is configured as a slave because there must be a minimum sized gap in time between consecutive request signals from a slave arbitration device to its master. For example, once in the off state 810 the slave disables its request signal on the REQ_MEM lead 291 for a time that is at least equal to a predetermined minimum pulse width. The predetermined minimum pulse width is a gap in the slave's request signal that is certain to be recognized by the master so as to cause the master to respond by disabling its grant signal on the GNT_MEM lead 290.

FIG. 9 illustrates a generalization of the client state diagram 800 in terms of a set of operational steps 900 in flow diagram form. As with the text accompanying FIG. 8, the general principle behind the operational steps 900 is that clients are addressed in a priority basis with immediate refresh requests intermixed at the highest priority and normal refresh requests intermixed when no other clients are making requests.

The operational steps 900 begin at step 908 and proceed to step 915. If it is determined at decision step 915 that there are no requests pending for any client, then processing idles at step 915. Alternatively, if it is determined at decision step 915 that there is a pending request from a client, then processing continues at step 921. If it is determined at decision step 921 that the arbitration device 118 is a slave configuration, then processing continues at step 925 to determine if the master arbitration device has granted cache memory 120 access to the slave. Alternatively, if it is determined at decision step 921 that the arbitration device 118 is not a slave configuration, then processing continues at step 928. If it is determined at decision step 925 that the master has the GNT_MEM signal lead 290 disabled, then processing idles at step 925 to wait for the signal to be enabled. Alternatively, if or when it is determined at decision step 925 that the GNT_MEM signal lead 290 is enabled, then processing continues to step 928.

If it is determined at decision step 928 that an immediate refresh is being requested, then processing continues at step 930 where memory is promptly refreshed prior to processing continuing at step 936. Alternatively, if it is determined at decision step 928 that an immediate refresh is not being requested, then processing continues at step 936

If it is determined at decision step 936 that the next client that is not a refresh client is requesting cache memory 120 access, processing continues at step 938 where the request state machine 235 and grant state machine 240 operate cooperatively to obtain a grant of access to cache memory 120 on behalf of the requesting client. Details of the request state machine 235 are disclosed in the text accompanying FIGS. 10–11. Details of the grant state machine 240 are disclosed in the text accompanying FIGS. 12–13. Once cache memory 120 access is obtained at step 938, the present client can begin transferring data at steps 942 and 946.

If it is determined at decision step 942 that the burst count limit has not been reached for the present client transfer, then processing continues at step 946. If it is determined at decision step 946 that the present client is still requesting access to the cache memory 120, then the client data transfer continues at step 948 in conjunction with the decision steps 942 and 946. If at any time during the client data transfer the burst count limit of the data transfer is reached at decision step 942, or it is determined that the present client is no longer requesting cache memory 120 access at decision step 946, then the client data transfer stops and processing continues at step 950.

If it is determined at decision step 950 that there are more internal clients available to process for potential access to cache memory 120, then processing continues at step 928 as previously disclosed. Alternatively, if it is determined at decision step 950 that there are no additional internal clients to process at this time, then processing continues at step 955.

If it is determined at decision step 955 that the arbitration device 118 is configured as a slave device, then processing continues at step 975. Alternatively, if it is determined at decision step 955 that the arbitration device 118 is not configured as a slave device, then processing continues at step 962. If it is determined at decision step 962 that an external client is requesting cache memory 120 access, then processing continues to step 965 where cache memory 120 access is obtained for the external client for the length of time the external client maintains the request. Alternatively, if or when it is determined at decision step 962 that no external client request for cache memory 120 access exists, then processing continues at step 970.

If it is determined at decision step 970 that there are additional non-refresh client requests pending, then processing continues at step 928 as previously disclosed. Alternatively, if it is determined at decision step 970 that there are no additional non-refresh client requests pending, then processing continues at step 975. If it is determined at decision step 975 that there is a refresh request pending for either a normal refresh or an immediate refresh, then processing continues at step 978 to refresh memory as requested. Alternatively, if it is determined at decision step 975 that there is no refresh request pending, then processing continues at step 982.

If it is determined at decision step 982 that the present arbitration device 118 configuration is not a slave configuration, the processing continues at step 928 as previously disclosed. Alternatively, if it is determined at decision step 982 that the present arbitration device 118 configuration is a slave configuration, then processing continues at step 985 where the arbitration device 118 enters an off state. If it is determined at decision step 985 that the slave arbitration device 118 has not disabled its REQ_MEM 291 signal for a predetermined minimum pulse width period sufficient to cause the master to also disable its GNT_MEM 290 signal, then the slave device remains in the off state at step 985. Alternatively, if it is determined at decision step 985 that the slave arbitration device 118 has disabled its REQ_MEM 291 signal for a predetermined period sufficient to cause the master to also disable its GNT_MEM 290 signal, then processing continues at step 915 as previously disclosed.

Figure 10:
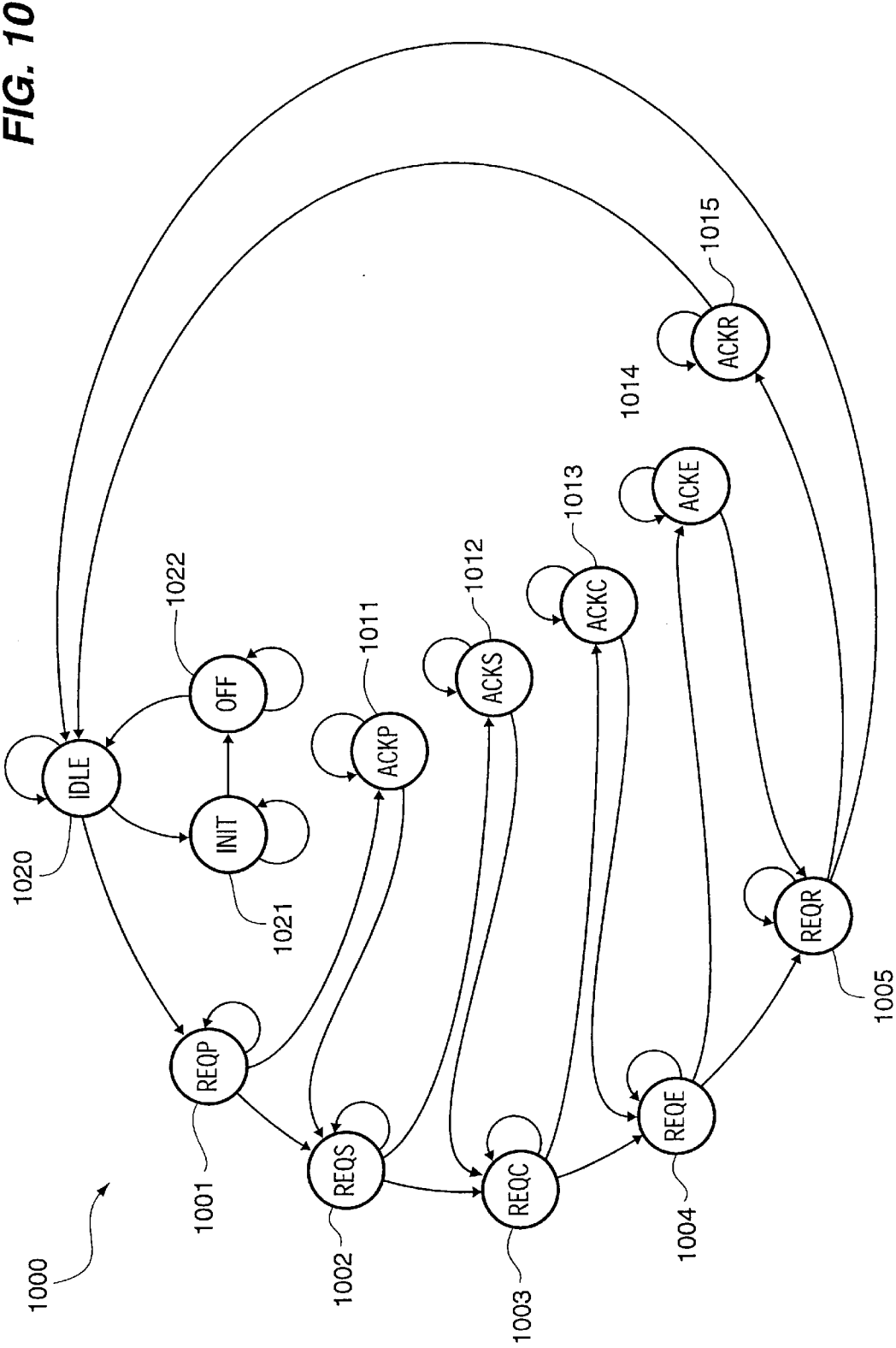
FIG. 10 illustrates an overview of the request state machine logic in state diagram form.
Figure 11:
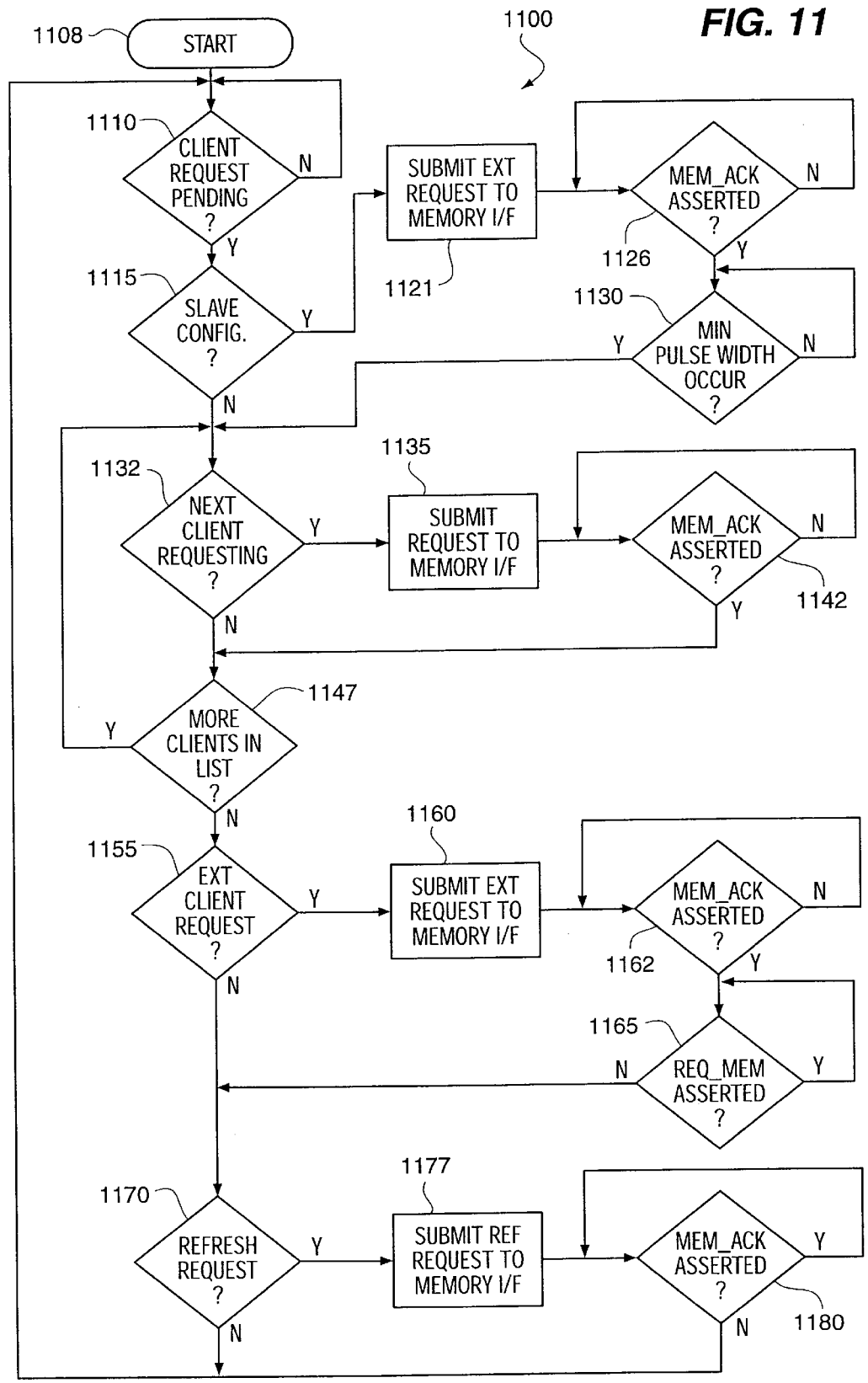
FIG. 11 illustrates a generalization of the request state machine logic operational steps in flow diagram form.

Request State Machine Operational Steps—FIGS. 10–11

FIG. 10 illustrates operational details of the request state machine 235 in the form of a request state diagram 1000. The request state machine 235 idles at the idle state 1020 until notified that a request is pending for a given client by way of the client state machine 230. After transitioning from the idle state 1020, each of a set of client states 1001–1005 is visited in turn to submit a cache memory 120 access request to the cache memory interface 116 on behalf of a given client. The request state machine 235 knows of a pending request because the client state machine 230 communicates this information at various points in the client state machine operational steps 900 that include, but are not limited to, steps 930, 938, 965, and 978 for example. If a request is pending for a given one of the clients 1001–1005, then the request state machine 235 communicates the request to the cache memory interface 116. Receipt of each request is acknowledged by the cache memory interface 116 as indicated by the acknowledgment states 1011–1015. Upon completion of any one acknowledgment, processing continues at the next client state in turn. However, from either the last state 1005 or the acknowledgment 1015 for a request from the last state 1005, processing returns to the idle state 1020. Note that the REQE state 1004 and ACKE state 1014 for an external device request and acknowledgment only exist for an arbitration device 118 configured as a master.

If it is determined that the arbitration device 118 is configured as a slave then the request state machine 235 transitions to the initialization state 1021. Once in the initialization state 1021, an external client request signal is sent on the MEM_EXT lead 281 to the cache memory interface 116 to indicate that the slave is ready to release cache memory interface 116. Once an acknowledgment to the MEM_EXT signal is received back from the cache memory interface 116 on the MEM_ACK signal lead 284, the request state machine 235 transitions to the off state 1022. The off state 1022 exists only for an arbitration device that is configured as a slave because there must be a minimum sized gap in time between consecutive request signals from a slave arbitration device to its master. Once in the off state 1022, the slave disables its request signal on the REQ_MEM lead 291 for a time that is at least equal to a predetermined minimum pulse width. The predetermined minimum pulse width is a gap in the slave's request signal that is certain to be recognized by the master so as to cause the master to respond by disabling its grant signal on the GNT_MEM lead 290. Once the predetermined minimum pulse width period is expired, then the request state machine 235 transitions to the idle state 1020 for subsequent processing as previously disclosed.

FIG. 11 illustrates a generalization of the request state diagram 1000 in terms of a set of operational steps 1100 in flow diagram form. Operational steps 1100 begin at step 1108 and proceeds to decision step 1110 where if it is determined that there is no client request for access to cache memory 120 that needs forwarding to the cache memory interface 116, processing idles at step 1110. Alternatively, if it is determined at decision step 1110 that a client request for access to cache memory 120 is pending, then processing continues at step 1115.

If it is determined at decision step 1115 that the arbitration device 118 is configured as a slave device, then processing continues at step 1121. Alternatively, if it is determined at decision step 1115 that the present configuration of the arbitration device 118 is not a slave device, then processing continues at step 1132. At step 1121 a cache memory 120 access request is submitted on the MEM_EXT signal lead 281 to the cache memory interface 116 on behalf of the slave device and processing continues at step 1126. If it is determined at decision step 1126 that an acknowledgment has not yet been received for the cache memory 120 access request, then processing continues to wait at step 1126. Alternatively, if or when it is determined at decision step 1126 that an acknowledgment has been received for the immediate cache memory 120 access request, then processing continues at step 1130. If it is determined at decision step 1130 that the REQ_MEM signal lead 291 has not been disabled for at least a minimum pulse width, then processing waits at step 1130. If or when it is determined at decision step 1130 that a minimum pulse width has occurred on the REQ_MEM signal lead 291, then processing continues at step 1132.

If it is determined at decision step 1132 that the next internal client in the set of internal clients is requesting access to cache memory 120 by having a request signal enabled on a REQ signal lead such as 274 or 277, then processing continues at step 1135. At step 1135 a cache memory 120 access request is submitted on an appropriate one of the internal client request leads 282–283 to the cache memory interface 116 on behalf of the requesting client. Note that although concurrent requests may exist on the REQ signal leads 274 and 277 for example, only one request is forwarded at a time to cache memory interface 116 on one of the internal client IC_REQ signal leads 282–283 to cache memory interface 116. If it is determined at decision step 1142 that an acknowledgment to the request has not been received by the request state machine 235 on the MEM_ACK signal lead 284, then the request state machine 235 waits for an acknowledgment. Alternatively, if or when it is determined at decision step 1142 that an acknowledgment to the request has been received by the request state machine 235 on the MEM_ACK signal lead 284, then processing continues at step 1147. If it is determined at decision step 1147 that there are additional internal clients that have requests for cache memory 120 access pending, then processing continues at step 1132 as previously disclosed. Alternatively, if it is determined at decision step 1147 that there are not additional internal client having requests for cache memory 120 access pending, then processing continues at step 1155.

If it is determined at decision step 1155 that the present arbitration device 118 configuration is a master configuration and that there is an external device requesting access to cache memory 120, then processing continues at step 1160. At step 1160 a request for cache memory 120 access is submitted by the request state machine 235 on the MEM_EXT signal lead 281 to the cache memory interface 116 on behalf of the external client. If it is determined at decision step 1162 that an acknowledgment to the request has not been received by the request state machine 235 on the MEM_ACK signal lead 284, then the request state machine 235 waits for an acknowledgment. Alternatively, if or when it is determined at decision step 1162 that an acknowledgment to the request has been received by the request state machine 235 on the MEM_ACK signal lead 284, then processing continues at step 1165. If it is determined at decision step 1165 that the REQ_MEM signal lead 291 is enabled, then the cache memory interface request signal on the MEM_EXT signal lead 281 remains enabled because the external client is not finished accessing cache memory 120. Only when it is determined at decision step 1165 that the REQ_MEM signal lead 291 is disabled, does the arbitration device 118 know that the MEM_EXT signal lead 281 can be disabled so that a new request can be made on behalf of the next client requesting access to cache memory 120.

If it is determined at decision step 1170 that a refresh request is pending, then processing continues at step 1177 where the refresh request is submitted to the cache memory interface 116 by a refresh request signal on the FWD_REQ_REF signal lead 280. If it is determined at decision step 1180 that an acknowledgment to the refresh request has not been received by the request state machine 235 on the MEM_ACK signal lead 284, then the request state machine 235 waits for an acknowledgment. Alternatively, if or when it is determined at decision step 1180 that an acknowledgment to the refresh request has been received by the request state machine 235 on the MEM_ACK signal lead 284, then processing continues at step 1115 as previously disclosed. Similarly, if it is determined at decision step 1170 that a refresh request is not pending, then processing continues at step 1115 as previously disclosed.

Figure 12:
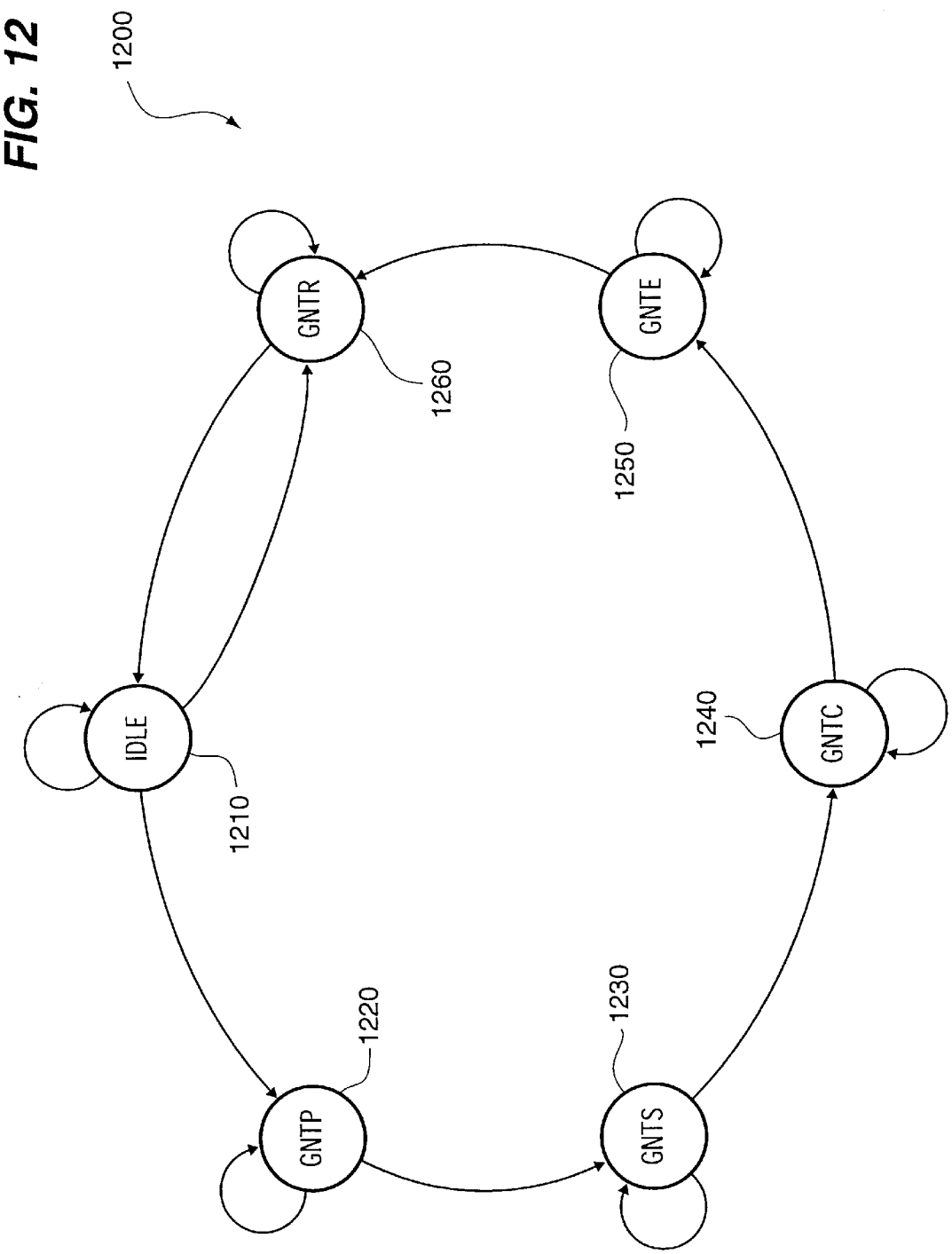
FIG. 12 illustrates an overview of the grant state machine logic in state diagram form.
Figure 13:
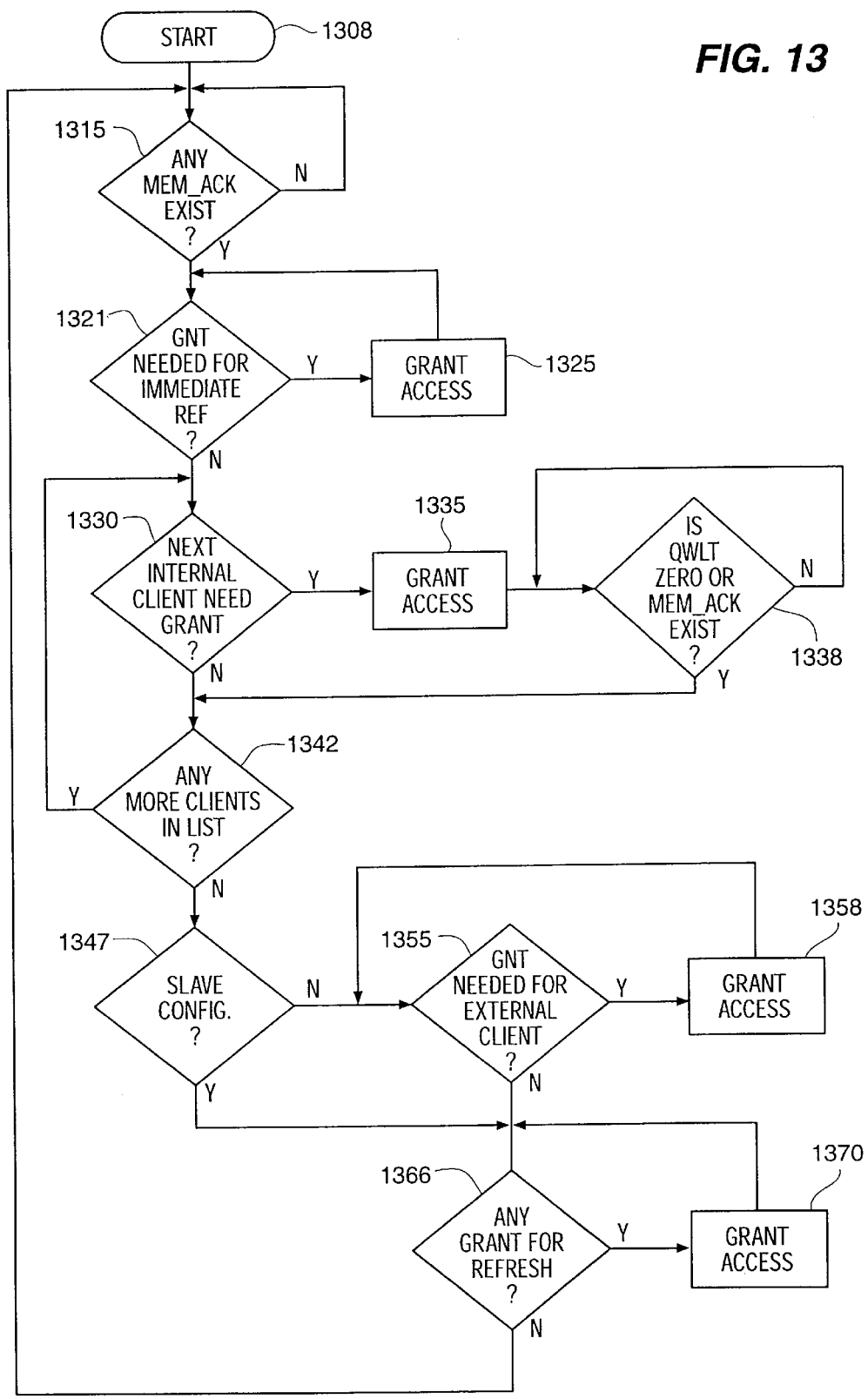
FIG. 13 illustrates a generalization of the grant state machine logic operational steps in flow diagram form.

Grant State Machine Operational Steps–FIGS. 12–13

FIG.12 illustrates operational details of the grant state machine 240 in the form of a grant state diagram 1200. The grant state machine 240 idles at the idle state 1210 until an acknowledgment signal on the MEM_ACK signal lead 284 is received from the cache memory interface 116. An acknowledgment indicates that access to cache memory 120 can be granted to the client on whose behalf a request is presently pending. Once an acknowledgment signal is received on the MEM_ACK lead 284, the grant state machine 240 transitions to each of the client states 1220–1260 in turn to grant successive clients access to cache memory 120. Each internal client 1220–1240 is granted access to cache memory 120 so long as the Quad Words Left to Transfer (QWLT) is not zero and no new acknowledgment exists on the MEM_ACK lead 284. The external client state GNTE 1250 is only visited by master arbitration devices. The refresh client state GNTR 1260 is only granted access to cache memory 120 if a request for refresh access exists.

FIG. 13 illustrates a generalization of the grant state diagram 1200 in terms of a set of operational steps 1300 in flow diagram form. Operational steps 1300 begin at step 1308 and proceed to decision step 1315 where if it is determined that an acknowledgment from the cache memory interface 116 has not yet been received on the MEM_ACK lead 284, then processing continues to wait at step 1315. Alternatively, if or when it is determined at decision step 1315 that an acknowledgment has been received on the MEM_ACK lead 284, then processing continues at step 1321.

If it is determined at decision step 1321 that a grant of access to cache memory 120 is required for an immediate refresh, then processing continues to step 1325 where access is granted for the length of time access is required. Alternatively, if it is determined at decision step 1321 that a grant of access to cache memory 120 is not required for an immediate refresh, then processing continues at step 1330.

If it is determined at decision step 1330 that the next internal client in the set of internal clients has requested and is ready for a grant of access to cache memory 120, then processing continues at step 1335 where the access is granted by enabling the appropriate one of the internal client GNT signal leads such as 275 or 278. If it is determined at decision step 1338 that the QWLT is not zero and that no acknowledgment exists on MEM_ACK lead 284, then the grant of access to cache memory 120 continues. Alternatively, if it is determined at decision step 1338 that either the QWLT for the present client is zero or there is an acknowledgment on MEM_ACK lead 284, then processing continues at step 1342. If it is determined at decision step 1342 that there are additional internal clients in the set of internal clients that require a grant of access to cache memory 120, then processing continues at step 1330 as previously disclosed. Alternatively, if it is determined at decision step 1342 that there are no additional internal clients in the set of internal clients that require a grant of access to cache memory 120, then processing continues at step 1347.

If it is determined at decision step 1347 that the arbitration device 118 is configured as a slave, then processing continues at step 1366. Alternatively, if it is determined at decision step 1347 that the present arbitration device 118 is configured as a master or a single device, but not a slave, then processing continues at step 1355. If it is determined at decision step 1355 that an external client requires a grant of access to cache memory 120, then processing continues at step 1358 where access is granted to the external client until the external client disables the REQ_MEM signal lead 291 for at least a minimum pulse width. When a minimum pulse width is detected on the REQ_MEM signal lead 291, the master disables the GNT_MEM signal lead 290 to terminate access to cache memory 120. Alternatively, if it is determined at decision step 1355 that no external client requires a grant of access to cache memory 120, then processing continues at step 1366.

If it is determined at decision step 1366 that a normal or immediate refresh request is pending, then processing continues at step 1370 where the refresh client is granted access to cache memory 120 for the length of time required to complete the refresh operation. The grant of access to cache memory 120 is communicated to the refresh logic 113 by enabling the GNT_REF signal lead 253. Alternatively, if it is determined at decision step 1366 that a grant of cache memory 120 access is not required, then processing continues at step 1315 as previously disclosed.

Summary

A multiple client memory arbitration system that includes a single, master, and slave configurable device for arbitrating internal and/or external clients of a single cache memory, and including a failover system for memory refresh purposes as between the master and slave devices. Although specific embodiments are disclosed herein, it is expected that persons skilled in the art can and will make, use, and/or sell alternative enhanced dual port I/O bus bridges that are within the scope of the following claims either literally or under the Doctrine of Equivalents.

What is claimed is:

1. A multiple client memory arbitration system for a cache memory in an I/O controller device having a plurality of internal clients of said cache memory and at least one external client of said cache memory, said system comprising:

an arbitrator of said cache memory in said I/O controller device;

means for selecting a configuration type for said I/O controller device selected from a group of configuration types consisting of: unknown device configuration, single device configuration, multiple device master configuration, and multiple device slave configuration, wherein said arbitration system is capable of operating said unknown device configuration, said single device configuration, said multiple device master configuration, and said multiple device slave configuration, and wherein said means for selecting said configuration type includes means for defining a configuration field in a register of said I/O controller, means for programming said configuration field with a selected one of said configuration type, and means for testing said configuration field at arbitraton device initialization time to identify said configuration type;

means for configuring said arbitrator of said cache memory based on said configuration type;

means for refreshing said cache memory at any time independent of said configuration type; and means for executing failover control of said cache memory in an event of an I/O controller device failure in a multiple device configuration.

2. A system according to claim 1 wherein said configuration type of said unknown device configuration includes:

means for preventing access to said cache memory for any internal client and any external client to said I/O controller device.

3. A system according to claim 1 wherein said configuration type of said single device configuration includes:

means for limiting access to said cache memory to only said plurality of internal clients of said I/O controller device.

4. A system according to claim 2 wherein said configuration type of said dual device master configuration includes:

means for arbitrating access to said cache memory among said plurality of internal clients of said I/O controller device and said at least one external client that is operationally independent of said I/O controller device.

5. A system according to claim 1 wherein said configuration type of said dual device slave configuration includes:

an external master that controls access to said cache memory;

means for arbitrating requests for access to said cache memory from among said plurality of internal clients of said I/O controller device having said dual device slave configuration; and means for requesting said external master for access to said cache memory on behalf of one of said plurality of internal clients of said I/O controller device.

6. A system according to claim 1 wherein said means for executing failover includes:

means for identifying a failed arbitrator between a first arbitrator and a second arbitrator;

means for disabling a failed one of said first arbitrator and said second arbitrator; and means for continuing an uninterrupted operational state of a surviving one of said first arbitrator and said second arbitrator as a single arbitration device having a single device arbitration configuration.

* * * * *